Aug. 21, 1945.  B. A. REYNOLDS  2,383,215
MIXING VALVE
Filed July 26, 1943
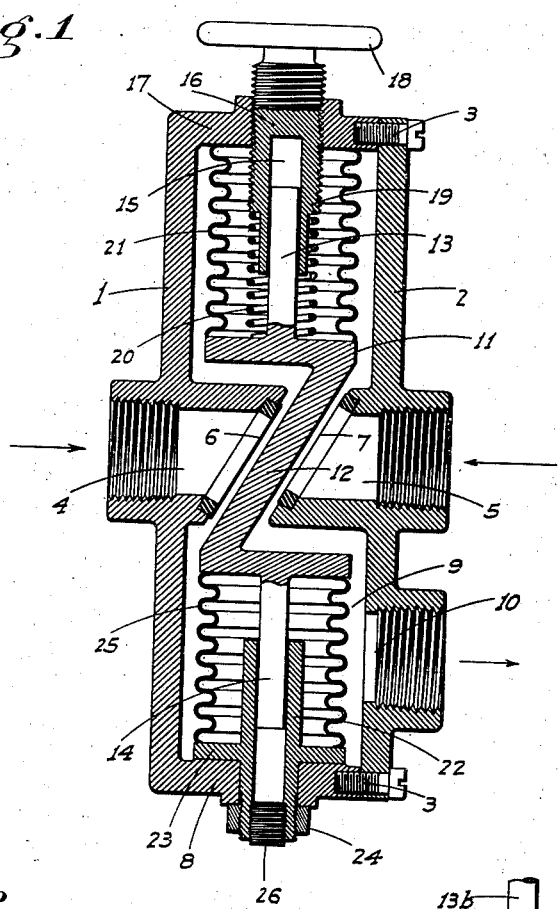
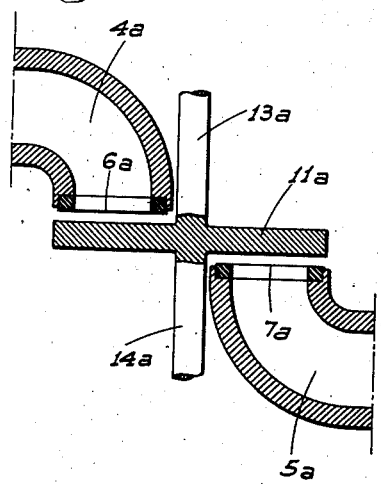
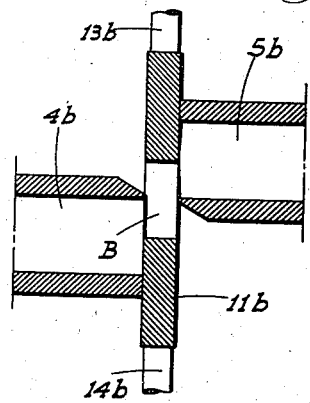
INVENTOR
B. A. Reynolds
BY
ATTYS Patented Aug. 21, 1945

2,383,215

UNITED STATES PATENT OFFICE 2,383,215

MIXING VALVE

Burl A. Reynolds, Lodi, Calif.

Application July 26, 1943, Serial No. 496,164

1 Claim. (Cl. 236—12)

This invention relates in general to improvements in mixing valves as used in connection with hot and cold water pipes to deliver a mixed, temperature controlled stream to a common outlet such as a shower bath, tub, or sink.

In particular the invention is directed to, and it is an object to provide, a mixing valve, as above, constructed so that when initially set to deliver a stream of water at a certain temperature, the valve will automatically compensate for temperature fluctuations in either the cold or hot water supply and will maintain the delivery stream at substantially the temperature for which the valve is initially set.

Another object of the present invention is to provide a mixing valve, as in the preceding paragraph, which incorporates a novel form of valve actuated by a temperature responsive member in the mixing chamber; said temperature responsive actuating member being arranged to move the valve in one direction or the other, said valve being operative when moved in said one direction to decrease the volume of hot water input and proportionately increase the volume of cold water input, or when moved in the other direction to decrease the volume of the cold water input and proportionately increase the volume of the hot water input.

An additional object of this invention is to provide a mixing valve of the type described in which the temperature responsive valve actuating member is a sealed metallic bellows filled with an expansible gas.

It is also an object of the invention to provide a mixing valve constructed with a minimum of working parts, said parts being arranged so that sand, grit or other foreign substance which may pass through the valve cannot damage said working parts or effect proper operation thereof.

A further object of the invention is to produce a simple, easily manufactured, and inexpensive mixing valve, and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a sectional elevation of the mixing valve.

Figure 2 is a fragmentary section showing a modified type of valve assembly.

Figure 3 is a fragmentary section showing a further modification of the valve assembly.

Referring now more particularly to the characters of reference on the drawing, and particularly at present to the device as shown in Fig. 1, the numeral 1 indicates an elongated housing which includes a removably mounted side 2 secured in place by screws 3; said side being separate and removable to facilitate initial assembly and subsequent maintenance of the device.

Hot and cold water ports, indicated at 4 and 5 respectively, are formed in and extend through opposite sides of the housing 1 in axially alined relation; the inner ends of said ports being formed with valve seats 6 and 7 respectively. Valve seats 6 and 7 are disposed in spaced parallel relation, and extend diagonally relative to the longitudinal axis of the housing.

The interior of the housing between the above port arrangement and an end 8 of the housing, forms a mixing chamber 9 from which an outlet or delivery port 10 leads through the removable side 2 of said housing.

A Z-shaped valve element 11 having a flat-faced intermediate leg 12 whose faces are parallel and of substantial width, is disposed in housing 1 with said leg 12 extending between the valve seats 6 and 7 in parallel relation thereto. It will be seen that with movement of the Z-shaped valve element 11 lengthwise of the housing, and in a direction away from end 8 of said housing the intermediate valve leg 12 will move toward valve seat 6, reducing the flow of hot water into the mixing chamber 9, and simultaneously will move away from valve seat 7, which proportionately increases the flow of cold water into said mixing chamber. The converse results when the Z-shaped valve element 11 moves in an opposite direction.

Valve stems 13 and 14 are formed with and project axially of the housing from opposite ends of the Z-shaped valve element 11. The valve stem 13 slidably projects into the bore 15 of a sleeve-like adjustment screw 16 threaded through the end 17 of housing 1; said adjustment screw having a control knob 18 formed on the outer end thereof. The inner end portion of the adjustment screw is reduced in diameter to form an inwardly facing shoulder 19, and a compression spring 20 surrounds said reduced portion and engages between shoulder 19 and the adjacent end of the valve element 11. A metallic bellows 21 surrounds the stem 13, adjustment screw 16 and spring 20; said bellows being connected in sealed relation at its outer end with the end 17 of housing 1 and at its inner end with the corresponding end of valve element 11.

The valve stem 14 is slidably supported in a guide sleeve 22 which projects into the mixing chamber 9 through the end 8 of the housing, said guide sleeve including an annular radially extending shoulder 23 which seats against the inside of said end 8 of the housing, and a lock nut 24 is threaded on the outer end of sleeve 22 to secure the above sleeve and shoulder unit in place. Another metallic bellows 25 is connected in sealed relation between the annular shoulder 23 and the adjacent or corresponding end of the Z-shaped valve element 11. This bellows 25 is filled with an expansible gas.

As the valve stem 14 has an easy running fit in the sleeve 22, the gas is introduced into bellows 25 from the outer end of said sleeve, and which end is normally closed by a sealed screw plug 26.

As will be apparent, the bellows prevent access of water or foreign matter to the working parts enclosed therein, assuring against corrosion of or damage to said parts. Also no packing gland is needed about the adjusting screw.

In use, the above described mixing valve is initially regulated by control knob 18 so that the Z-shaped valve element, and particularly the intermediate valve leg 12 thereof, is so disposed relative to valve seats 6 and 7 as to provide the desired delivery temperature from port 10. As the bellows 21 and 25 are opposed, of the same size, and present the same surface area to water pressure in the body, said pressure is neutralized and does not affect proper operation of the device, and the spring 20 can be adjusted by screw 16 to initially set the valve element 11 so as to provide a desired delivery temperature.

However, if during operation of the valve there is any material variation in the temperature of the incoming hot or cold water, the temperature of the mix in the chamber 9 will correspondingly vary. When this occurs the gas in bellows 25 will either expand or contract, producing a lengthening or shortening of said bellows and a corresponding movement of the valve element 11. This automatically regulates and maintains a substantially constant temperature at the delivery port 10.

Referring now to the modified valve assembly shown in Fig. 2, the valve element is a transverse valve plate 11a which faces lengthwise of the device, said plate having valve stems 13a and 14a projecting from opposite faces thereof and centrally of its ends. The hot and cold water ports 4a and 5a, respectively, are of elbow configuration and disposed with their inner ends opposed but spaced apart some distance transversely as well as longitudinally of the device, and on opposite sides of the axis of valve stems 13a and 14a. The inner ends of hot and cold water ports 4a and 5a are formed with valve seats 6a and 7a respectively, and the valve plate 11a is disposed in normal clearance relation to and in a plane extending between said seats but for cooperation therewith; movement of the plate toward or away from said seats regulating the delivery temperature of the water.

In Figure 3 I disclose a further modification of the valve assembly, and in this modification the hot and cold water ports 4b and 5b are straight, parallel, and extend transversely into the device in offset relation lengthwise thereof; the inner and valve seat forming ends of said ports 4b and 5b terminating in spaced relation. A slide valve 11b is disposed in engagement with and for movement transversely of said inner ends of the ports 4b and 5b in a direction lengthwise of the device; said slide valve including a central, transverse bore B adapted to simultaneously register to a variable extent with both of said ports, dependent on the position of said valve. The valve 11b includes opposed valve stems 13b and 14b which support said valve for guided movement.

The balance of the mixing valve in which the above described embodiments of Figs. 2 and 3 is employed, is substantially the same as described in connection with Fig. 1, and these embodiments function in a similar manner.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A mixing valve comprising a casing, a pair of opposed ports opening into the casing from opposite sides thereof, the inner ends of the ports being cut diagonally of the longitudinal axes of the ports and such diagonal ends being parallel to each other and disposed in spaced apart relation, a relatively flat plate disposed between the spaced diagonal ends of the ports and in parallel relation thereto, the thickness of the plate being less than the space between the ports, each end of the plate extending to a point spaced from said ports, a secondary plate connected with each end of the first plate and lying substantially parallel to the ports and to each other, a guide pin extending outwardly from each of the last named plates, guide sleeves projecting into the casing from each end of such casing, the pins being movable in guided relation in said sleeves, bellows connected in sealed relation between each of said last named plates and the adjacent end of the casing and enclosing said pins and sleeves, one of said bellows being filled with an expansible fluid; and an outlet port leading from the casing.

BURL A. REYNOLDS.